April 26, 1955   A. LUCCHETTI   2,706,866
FISHING DEVICE
Filed March 9, 1954

INVENTOR.
Albert Lucchetti

ECKHOFF & SLICK
ATTORNEYS

BY
A MEMBER OF THE FIRM

United States Patent Office 2,706,866
Patented Apr. 26, 1955

2,706,866

FISHING DEVICE

Albert Lucchetti, Los Altos, Calif.

Application March 9, 1954, Serial No. 414,937

1 Claim. (Cl. 43—15)

This invention relates to a fishing device, and particularly relates to a device to aid in the catching of bottom-feeding fish.

Many fish such as striped bass and the like feed on the bottom, which means that the bait used in fishing for such fish must rest on the bottom. When fishing for such fish, with the bait resting on the bottom, it is easy for the angler to miss a bite since the fish can nibble at the bait and tug on it gently without giving any indication at the surface that a fish is near the bait.

In accordance with the present invention, a device is provided which is spring-actuated, and which will automatically give a sudden jerk on the hook when the fish exerts a slight pressure on the bait. By giving a sudden jerk on the hook, many fish will be caught which would otherwise get away.

The present invention also provides a device which lies on the bottom and which can easily roll over so that the jerking force will be exerted straight on the line. Further, the device of the present invention is shaped in such a manner that it tends to act like an anchor so that when the spring mechanism is released, substantially all of the force of the spring will be directed to the hook and will not react substantially on the line. Also, in the present invention, a structure is provided wherein the spring actuated mechanism is protected and will not become fouled upon lying upon the bottom.

It is therefore an object of the present invention to provide a device for catching bottom-feeding fish which will exert a spring action, snagging the fish.

Still another object of this invention is to provide a device which will roll along the bottom so that the spring action will be directed almost entirely toward the fish.

Another object of this invention is to provide a device which will act as an anchor and which also serves to protect the spring mechanism.

In the drawings forming a part of this application:

Figure 1:
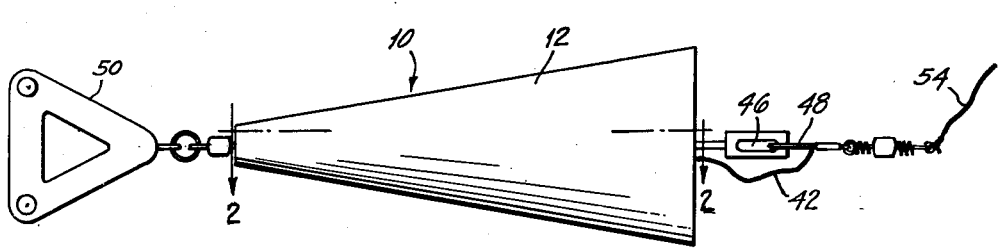
Figure 1 is a plan view of the device of the present invention.

Referring now to the drawings by reference characters, there is shown a device generally indicated at 10 for attachment between a fish hook and a fishing line. The device consists of an outer conical portion 12 with a substantially closed end 14 and an open end 16. Positioned within the conical portion 12, and substantially at the center thereof, is a tube 18. The tube 18 is supported throughout most of its length by the fin-like member 20. The parts thus far described are suitably made of a plastic, or they can be of metal. A rod 22 is adapted to slide in the tube 18, and one end of the rod terminates in a collar 32 and a projection 24. The projection 24 moves through a slot 26 in the tube 18. A retainer 28 is provided in the tube for retaining a compression spring 30 therein. The spring 30 is held between the collar 32 on the rod 22, and the retainer 28 in compression and, in the absence of any other restraining force, the parts assume the position shown in Figure 2.

Attached to the side of the tube 18 is a support 34 with a lever 36 pivoted thereon. One end of the lever 36 is provided with a catch 38, while the other end is drilled at 40 to provide an attachment for a cord 42 or similar tripping device. The rod 22 terminates at its far end in the member 44, which has an elongated slot 46 therein. Member 46 is adapted to receive a standard snap fastening 48. A line 42 is attached to the fastening 48, as is shown, and the length of the line 42 is adjusted in such a manner that when the device is set, as is shown in Figure 3, the snap 48 will be held at least part way forward in the slot 46.

Figure 5:
Figure 5 is a reduced perspective view of the device of the present invention, showing the manner in which it is used.

In use, the device is assembled as is shown in Figure 5 with a weight 50 and a line 52 attached to one end of the device and a leader or similar fish line 54 attached to the snap fitting 48 and to the hook and bait 56.

Figure 2:
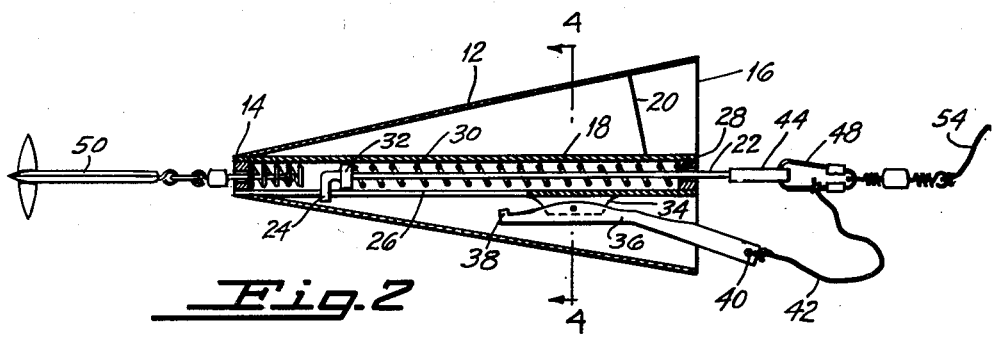
Figure 2 is a cross-sectional view on the lines 2—2 of Figure 1, showing the device in an uncocked position.
Figure 3:
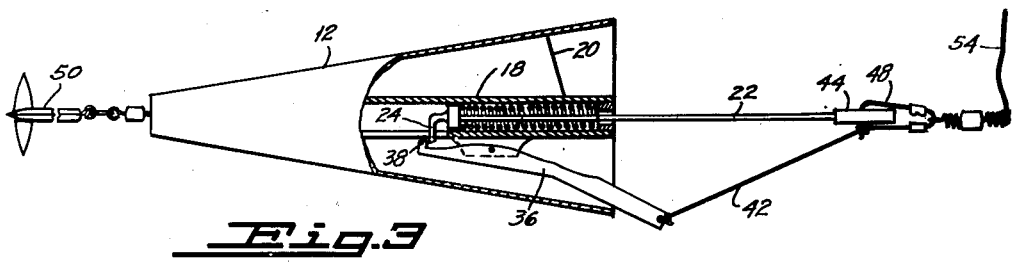
Figure 3 is a view, partly in section, showing the device of the present invention in a cocked position.
Figure 4:
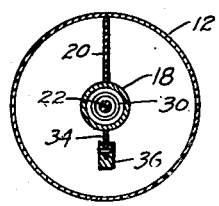
Figure 4 is a cross-section on the lines 4—4 of Figure 2.

The device is set by pulling outwardly on the rod 22, whereupon the catch 38 engages the projection 24, placing the parts in the position shown in Figure 3. If the line is lying to one side of the device, as is often the case, and a fish starts off with the bait, the device will roll to one side or the other so that it will be lined up with the bait and then, as a fish gives a slightly greater tug, the line 42 will cause the catch to be released, giving a sudden yank on the hook and leaving the parts as is shown in Figure 2. Ordinarily, the fish will be securely hooked and can then be drawn to the surface.

I am aware that others have provided devices for exerting a spring action on a fishing line, but such devices as have been used in the past have generally not been suitable for use against bottom fish. The device of the present invention has proved extremely useful in practice against such bottom-feeding fish.

I claim:

A device of the character described comprising in combination a conical member having an open end and a substantially closed end, a slotted tube inside said conical member concentric therewith and fastened thereto, a rod passing through said tube, a compression spring on said rod, one end of said rod terminating in a collar and a projection, said projection being movable through the slot in said tube, a retainer in said tube, said spring being held between said collar and said retainer and adjacent the open end of the conical member, a slotted member attached to the opposite end of said rod, a fastening member free to slide in said slotted member, a catch located on said tube and adapted to engage said projection and a flexible connection between said fastening member and said catch, whereby a pull on said fastening member will release said catch.

References Cited in the file of this patent

UNITED STATES PATENTS

| 2,611,988 | Gibson | Sept. 30, 1952 |
| 2,651,136 | Kruze | Sept. 8, 1953 |
| 2,659,174 | Leach | Nov. 17, 1953 |